Sept. 10, 1946.    H. H. WALLEY, JR., ET AL    2,407,591
SPRING TESTER
Filed April 19, 1944
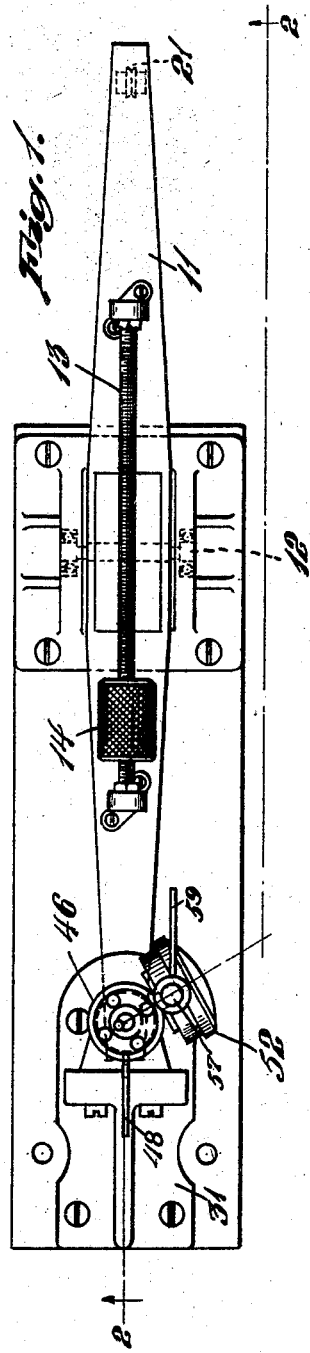
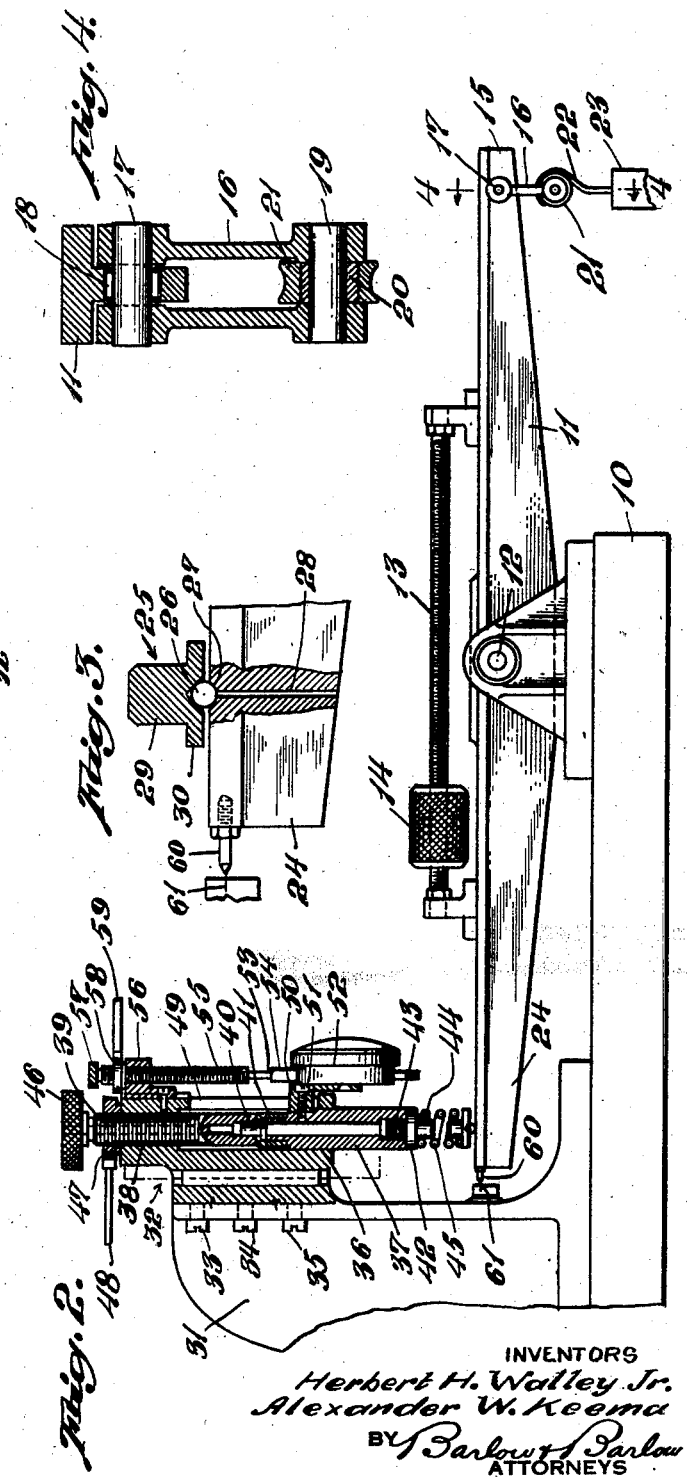
INVENTORS
Herbert H. Walley Jr.
Alexander W. Keema
BY Barlow & Barlow
ATTORNEYS Patented Sept. 10, 1946

2,407,591

UNITED STATES PATENT OFFICE 2,407,591

SPRING TESTER

Herbert H. Walley, Jr., and Alexander W. Keema, Providence, R. I., assignors to Merit Engineering, Inc., a corporation of Rhode Island Application April 19, 1944, Serial No. 531,700

1 Claim. (Cl. 73—161)

This invention relates to a device for testing a helically coiled spring.

In the use of a spring for loading operating parts it is desirable to know the force exerted by the spring when it is under compression at different linear axial distances. If the spring, when relaxed, is two inches in axial extent it is desired to know what pressure that spring exerts when compressed so that its axial extent is one inch or at other specific dimensions less than its relaxed condition. It has been difficult to determine with accuracy the exact point at which the spring will exercise a certain force.

One of the objects of this invention is to provide a device which will enable the spring to be loaded a certain definite amount and then the point determined in its axial extent when such pressure is exercised.

Another object of this invention is to provide a device which may be easily adjusted for compensation of small variations in weight of the spring or other normal irregularities and yet obtain a very accurate individual test for each piece of work tested.

Another object of the invention is to provide a device whereby a standard procedure may be followed for the determination of results which results may be comparable.

With these and other objects in view, the invention consists of certain novel features of construction, as will be more fully described and particularly pointed out in the appended claim.

In the accompanying drawing:

Fig. 1 is a top plan view of the device which is the subject of this invention;

Fig. 2 is a side elevation with the operating mechanism in section on substantially line 2—2 of Fig. 1;

Fig. 3 is a sectional detail of the beam and lower work support, also showing the pointer mounting;

Fig. 4 is a section on substantially line 4—4 of Fig. 2.

In proceeding with this invention we provide a means for balancing the work and the operating parts of the machine, also a means whereby a spring to be tested may be varied in its axial extent to apply more or less pressure on one side of the fulcrum of the beam while at the other side of the fulcrum of the beam weight is applied so that the pressure on the spring may be determined.

With respect to the drawing 10 designates a base upon which a beam 11 is fulcrumed as at 12. A threaded rod 13 is provided with a nut 14 which may be adjusted lengthwise of the beam 11 so that the beam may be balanced with the work and different parts which it may carry.

Adjacent one end 15 of the beam a member 16 is pivotally suspended by a pin 17 passing through the needle bearing 18 in the beam. At the lower end of this member another pin 19 is provided which extends from one part of the member to the other and carries the bearing 20 for a pulley 21 which may be engaged by a hook 22 of a receptacle or weight carrier 23 into which or upon which weight may be added to the beam. Where shot is used for weighting the beam the carrier 23 will be in the form of a receptacle to receive this shot.

The other end 24 of this beam carries a work engaging member 25 supported through ball 26 in a recess 27 formed in the beam from which there extends an opening 28 through the beam that dirt and foreign matter may escape. This member 25 has an upstanding portion 29 and a flange 30, the upstanding portion 29 being of a size to enter the helical spring to be tested while the flange 30 forms an abutment against which the end of this spring may rest. Members 25 of different size may be provided for springs of different size to be tested. This manner of mounting the member 25 permits freedom of movement that the spring may adjust itself in position as angularity of the beam occurs.

Standard 31 extends upwardly from the base 10 to which a head 32 may be secured by bolts 33, 34, and 35. This head may be adjusted to a position upwardly from that illustrated in Fig. 2 by utilizing the bolts 33 and 34 in the lower two holes of the head or the head may be adjusted downwardly from the position shown on the support 31 by utilizing bolts 34 and 35 to engage the upper two holes of the head. The position shown in Fig. 2 being the intermediate or middle position. By reason of this arrangement various ranges of the device for springs of varying lengths may be had. The head 32 is provided with a bore 36 in which a slide 37 is located for vertical movement. The upper part of this bore is reduced and threaded as at 38 for the reception of a threaded member 39 which is swivelly connected to the slide 37 by means of a shouldered pin 40 fixed in the lower end of the member 39 with its shoulder or head engaging the top wall of the inverted cup 41 which is fixed to the slide member 37.

At the lower end of the slide member a work guide is secured having a flange 42 with a threaded portion 43 threadingly engaging the slide member 37 while a protruding portion 44 comparable to the portion 29 of the member 25 will extend into the work which is shown in the form of a helical spring 45 so as to guide the same and retain the spring in position. The member 39 may be adjusted by the handle 46 and retained in adjusted position by a nut 47 having a detachable handle 48.

A slot 49 is provided in the head 32 through which a bracket 50 projects which is fixed to the slide by a bolt 51. This bracket serves to prevent rotation of the slide member 37 and also as a mounting for a dial indicator 52 which will move with the slide member 37. The feeler 53 of this dial indicator extends upwardly through the stem 54 to engage the adjustable abutment 55 which is threaded through the arm 56 extending outwardly from the head 32 and which may be adjusted by the handle 57 and retained in adjustment by a nut 58 having a detachable handle 59 thereon.

A pointer 60 is provided on the end 24 of the beam while a datum line 61 is porvided on the upstanding support 31 so that a horizontal or some relative position of the beam with reference to the standard 31 may be determined.

The dial indicator is adjusted so that the spring in the dial indicator will be compressed when the spring or work being tested is free and the abutment 55 in the device will be adjusted accordingly.

In operation of the device the work such as the helical coiled spring 45 is positioned upon the member 25 by the projecting portion 29 extending into the center portion of the spring. With no weight added to the beam which will be used for testing, the nut 14 is adjusted along threaded rod 13 until the pointer 60 will register with the datum line 61. The slide is withdrawn from the spring sufficiently so that nothing engages the top of the spring during this adjustment. After a balance is obtained the spring is then engaged at its upper end by the portion 44 extending centrally into the spring and by forcing the spring downwardly by means of the handle 46 and threaded member 39 until it is under compression. Weight is then added to the beam at the carrier 23, either by pouring shot into the bucket or by adding other weight, which weight will be of a known amount, such for instance as ten pounds. The handle 46 will then be turned so as to draw the slide 37 upwardly and permit the spring to extend in length. This will be carried out until a balance is obtained between the weight which has been added and the spring or work which is being tested. The condition of balance will be such that the pointer 60 will register with the datum line 61 as it initially did. When this condition occurs the distance between the abutment flanges 30 and 42 which engage the opposite ends of the spring will be determined from reading the dial indicator and it will be known at what axial distance the spring will exert a force of the weight added to the carrier (the distances of the weight and the spring support from the fulcrum being equal).

By this arrangement the axial extent of the spring at which a certain load occurs will be accurately determined by test. The dial indicator is very sensitive and may register to a very small part of an inch. The balance which is provided compensates for the various errors or weights of spring being tested.

We claim:

In a spring testing device, a base, a support standing upwardly therefrom, a datum line carried by said support, a beam fulcrumed on said base, a pointer carried at one end of the beam to swing over said datum line, rockable means at said end of the beam to directly engage the work, means at the other end of the beam to weight the beam, a head carried by said support, a member adjustable in said head with relation to said datum line to engage the other side of the work and means to indicate the adjustment of said member comprising a dial indicator carried by said member and an adjustable stop carried by said head and against which an actuator portion of the dial indicator engages.

HERBERT H. WALLEY, JR.
ALEXANDER W. KEEMA.